(12) United States Patent (10) Patent No.: US 9,397,982 B2
Ignatchenko (45) Date of Patent: Jul. 19, 2016

(54) SECURE KEY STORAGE SYSTEMS, METHODS AND APPARATUSES

(71) Applicant: OLogN Technologies AG, Triesen/FL (LI)

(72) Inventor: Sergey Ignatchenko, Innsbruck (AT)

(73) Assignee: OLogN Technologies AG, Triesen/FL (LI)

( * ) Notice: Subject to any disclaimer, the term of this patent is extended or adjusted under 35 U.S.C. 154(b) by 0 days.

(21) Appl. No.: 13/928,925

(22) Filed: Jun. 27, 2013

(65) Prior Publication Data

US 2014/0006788 A1 Jan. 2, 2014

Related U.S. Application Data

(60) Provisional application No. 61/665,695, filed on Jun. 28, 2012.

(51) Int. Cl.
*H04L 9/32* (2006.01)
*H04L 29/06* (2006.01)

(52) U.S. Cl.
CPC .......... *H04L 63/0428* (2013.01); *H04L 9/3263* (2013.01); *H04L 9/3268* (2013.01); *H04L 9/3247* (2013.01); *H04L 9/3297* (2013.01)

(58) Field of Classification Search
CPC ... H04L 9/3268; H04L 9/3297; H04L 9/3294; G06F 21/316; G06F 21/50; G06F 21/552
USPC .................. 713/156–158, 173, 175, 178, 180
See application file for complete search history.

(56) References Cited

U.S. PATENT DOCUMENTS

| 4,229,817 A | 10/1980 | Morgan et al. |
| 4,868,376 A | 9/1989 | Lessin et al. |
| 5,060,263 A | 10/1991 | Bosen et al. |
| 5,493,613 A | 2/1996 | Denno et al. |

(Continued)

FOREIGN PATENT DOCUMENTS

EP 1 152 378 A2 11/2001

OTHER PUBLICATIONS de la Puente et al., "Pocket device for authentication and data integrity on Internet banking applications," *Security Technology, 2003, Proceedings IEEE 37th Annual 2003 International Carnahan Conference*, pp. 43-50.

(Continued)

*Primary Examiner* — Shewaye Gelagay
*Assistant Examiner* — Trong Nguyen
(74) *Attorney, Agent, or Firm* — Arnold & Porter LLP (57) ABSTRACT

The systems, methods and apparatuses described herein provide a computing environment that manages private key storage. An apparatus according to the present disclosure may comprise a first non-volatile storage for storing a private root key for signing digital certificates, an input device for receiving manual input from an operator, a communication interface consisting of a one-way transmitter for transmitting information from the apparatus, and a processor. The processor may be configured to retrieve the private root key from the first non-volatile storage, receive information for a new digital certificate through the input device, generate the new digital certificate according to the received information, sign the new digital certificate using the private root key and transmit the new digital certificate from the apparatus using the transmitter.

32 Claims, 9 Drawing Sheets

(56) References Cited

U.S. PATENT DOCUMENTS

| | | |
|---|---|---|
| 5,917,913 A | 6/1999 | Wang |
| 6,662,020 B1 | 12/2003 | Aaro et al. |
| 6,826,690 B1 | 11/2004 | Hind et al. |
| 6,850,916 B1 | 2/2005 | Wang |
| 7,047,404 B1 | 5/2006 | Doonan et al. |
| 7,089,214 B2 | 8/2006 | Wang |
| 7,111,324 B2 | 9/2006 | Elteto et al. |
| 7,213,766 B2 | 5/2007 | Ryan et al. |
| 7,269,844 B2 | 9/2007 | Elteto et al. |
| 7,272,723 B1 | 9/2007 | Abbott et al. |
| 7,475,247 B2 | 1/2009 | Bade et al. |
| 7,587,756 B2 | 9/2009 | Peart et al. |
| 7,996,914 B2 | 8/2011 | Hirota et al. |
| 8,041,338 B2 | 10/2011 | Chen et al. |
| 2004/0167465 A1* | 8/2004 | Mihai et al. ............. 604/67 |
| 2004/0179692 A1 | 9/2004 | Cheng |
| 2005/0005097 A1* | 1/2005 | Murakawa ............. 713/156 |
| 2005/0021982 A1 | 1/2005 | Popp et al. |
| 2005/0033990 A1* | 2/2005 | Harvey et al. .......... 713/201 |
| 2005/0039055 A1* | 2/2005 | Balaz et al. ............ 713/201 |
| 2005/0138386 A1 | 6/2005 | Le Saint |
| 2005/0229005 A1 | 10/2005 | Le Saint et al. |
| 2006/0133615 A1 | 6/2006 | Bade et al. |
| 2007/0005981 A1* | 1/2007 | Miyazawa ............. 713/176 |
| 2007/0124536 A1 | 5/2007 | Carper |
| 2007/0136593 A1 | 6/2007 | Plavcan et al. |
| 2008/0114984 A1* | 5/2008 | Srinivasan et al. ...... 713/175 |
| 2009/0282254 A1 | 11/2009 | Wheller et al. |
| 2010/0180120 A1 | 7/2010 | Frenkel et al. |
| 2010/0235550 A1 | 9/2010 | Bolton et al. |
| 2010/0287370 A1 | 11/2010 | Gentry et al. |
| 2011/0004763 A1* | 1/2011 | Sato et al. ............. 713/175 |
| 2011/0047374 A1* | 2/2011 | Liu et al. .............. 713/156 |
| 2011/0119484 A1 | 5/2011 | Jallad et al. |
| 2012/0023329 A1* | 1/2012 | Yamamoto et al. ...... 713/158 |
| 2013/0097709 A1* | 4/2013 | Basavapatna et al. ...... 726/25 |

OTHER PUBLICATIONS

International Search Report issued in PCT/IB2013/001378 on Oct. 11, 2013.

Yee et al.,"Secure Coprocessors in Electronic Commerce Applications," *Proceedings of the 1st USENIX Workshop on Electronic Commerce*, pp. 155-170, 1995.

\* cited by examiner

SECURE KEY STORAGE SYSTEMS, METHODS AND APPARATUSES

RELATED APPLICATIONS

This application claims priority to U.S. Provisional Application No. 61/665,695, filed Jun. 28, 2012, entitled "Secure Key Storage Systems, Methods and Apparatuses," the content of which is incorporated herein by reference in its entirety.

FIELD OF THE DISCLOSURE

The systems, methods and apparatuses described herein relate to the secure electronic storage of cryptographic keys.

BACKGROUND

The public key infrastructure (PKI) is a well-known mechanism for electronically authenticating individuals. In the PKI, each entity (or individual) has a unique, asymmetric cryptographic key pair, comprising a public key and a private key. A certificate authority (CA) issues a digital certificate—an electronic document—listing the entity's identity credentials (e.g., name and organization) and the entity's public key, binding the entity's identity to its public key. The entity may use its keys to encrypt and decrypt information. For example, the entity may encrypt all or a portion of its outgoing messages with its private key, and may distribute its digital certificate along with the encrypted message. The message recipient may decrypt the encrypted message using the sender's public key, allowing the recipient to confirm that (i) the sender controls the corresponding private key, and therefore deduce (assuming that only the entity identified in the certificate has access to the corresponding private key) that (ii) the sender is the entity identified in the digital certificate.

Because PKI-based authentication is premised on the assumption that whoever is able to use a private key must be the entity identified in the corresponding digital certificate, the security of private keys is a crucial element of the PKI. An unauthorized individual or entity that has access to a private key can use that private key to impersonate the rightful owner in electronic communications and transactions.

Within a PKI environment, a certificate authority (CA) may use its root private key to sign all newly issued digital certificates and to perform other security-related functions (such as, for example, to sign certificate revocation lists (CRLs) and/or OCSP responses). Protecting the CA's root private key is very important to maintaining the legitimacy of the CA and fundamentally the general concept of the PKI. If a CA's root private key is compromised, nothing which has been signed using that root certificate—e.g., any subordinate certificates signed by the root certificate, or any leaf certificates signed by a subordinate certificate—can be trusted, therefore making the CA essentially useless. At the same time, the CA needs to execute these signing operations using the securely stored root key quickly and efficiently.

A variety of systems and methods are used to protect private keys from unauthorized use, ranging from software-level encryption to hardware-based cryptography. For example, some operating systems store private keys in files which have been encrypted using a random symmetric key (also referred to as a master key) that has in turn been encrypted and stored elsewhere within the operating system. In other systems, private keys may be stored in tamper-resistant and/or tamper-evident hardware.

However, such systems and methods may still be vulnerable to attacks. For example, software-based security mechanisms can be susceptible to vulnerabilities in the host operating system. Many hardware-based cryptography devices, which are generally considered to be more secure, are still controlled by or via software (such as an operating system), which may expose those hardware devices to attack through vulnerabilities in the software. If an attacker can instruct the hardware device to sign anything the attacker wants, in many scenarios it is functionally similar to owning the private key itself.

In general, security levels which are acceptable for individuals are often inadequate for storing CA root keys because of the difference in the impact of a compromise. When an individual's key is compromised, it affects only this individual and perhaps the several dozen of people with whom he communicates. When a CA's root key is compromised, however, potentially hundreds of millions of people may be affected. On the other hand, the resources (both hardware and software) available to CAs are generally much more significant than those available to the average individual.

What is needed are systems, methods and apparatuses which may provide highly secure private key storage, while simultaneously ensuring that operations requiring the use of private keys can be performed in a timely manner.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure provides systems, methods and apparatuses configured to securely store cryptographic keys, while simultaneously ensuring that operations requiring the use of these stored keys can be performed in a timely manner. For example, the systems, methods and apparatuses disclosed herein may be useful for the storage of certificate authority (CA) root private keys, which may need to be accessed frequently for the purpose of signing subordinate certificates, or for the purpose of re-signing CRLs or OCSP responses.

Figure 1:
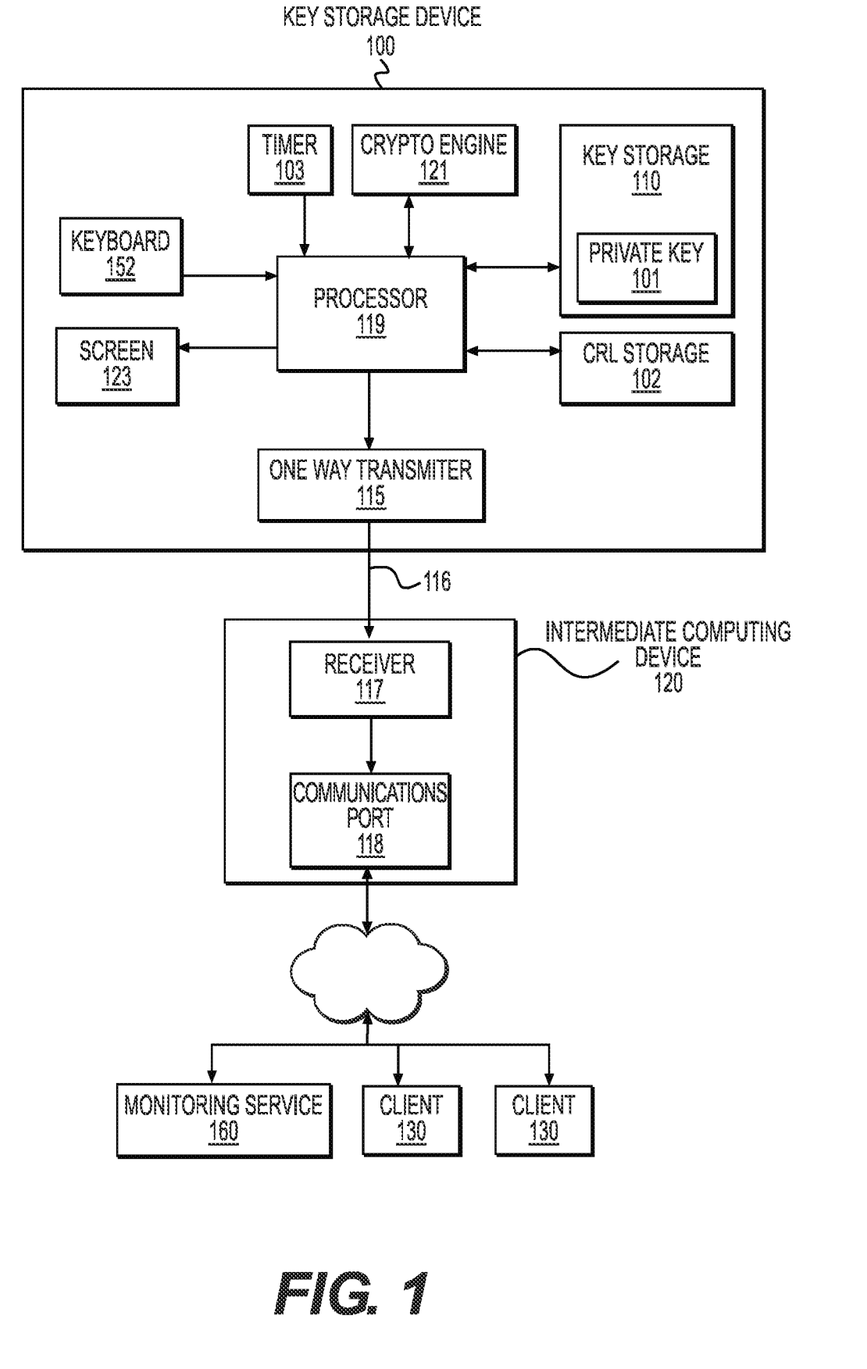
FIG. 1 is a block diagram of an exemplary device and/or system according to the present disclosure.

FIG. 1 shows an exemplary system according to the present disclosure. As shown on FIG. 1, the system may first comprise one or more cryptographic key storage devices 100 configured to store and manipulate secret cryptographic keys. The key storage device 100 may be comprised of any appropriate computing device capable of performing the functionality discussed herein such as, but not limited to, a personal computer, a workstation, a server, a specially designed computing device, or the like.

A key storage device 100 may first comprise a key storage 110 configured to store one or more cryptographic keys 101, such as a private key (i.e., the private part of an asymmetric key pair). The key storage 110 may be any suitable form of volatile storage (such as RAM) or non-volatile storage (such as a hard disk drive, flash memory, solid state disk, CD-ROM, etc.).

The key storage device 100 may also comprise a Certificate Revocation List (CRL) storage 102. This CRL storage 102 may be used to store one or more CRLs which may be used by a client device 130 to validate one or more subordinate certificates created and signed according to the present disclosure. Like the key storage 110, the CRL storage 102 may be any suitable form of volatile storage (such as RAM) or non-volatile storage (such as a hard disk drive, flash memory, solid state disk, CD-ROM, etc.).

As shown in the exemplary block diagram of FIG. 1, the key storage device 100 may further comprise at least one processor 119, which may be configured, among other things, to: (1) retrieve a private key 101 previously stored within key storage 110; (2) use a retrieved private key 101 to sign a subordinate certificate; and/or (3) use a retrieved private key 101 to sign a CRL. One having ordinary skill in the art will understand that this processor 119 may be any of a microcontroller, computer processor, programmable circuitry, application-specific integrated circuit (ASIC) or any other appropriate device. Furthermore, in certain embodiments, one or more processors 119 may contain internal memory, such as a cache (not shown), which can be used to temporarily store certain data likely to be accessed frequently (such as created CRLs, as discussed in greater detail below). In other embodiments, such a cache (not shown) may be separate from, but connected to, one or more processors 119.

The key storage device 100 additionally may comprise a timer 103, which may be configured to keep track of a current time, and may further be configured to generate one or more timestamps. In certain embodiments, this timer 103 may be a high-precision clock that may, for example, be implemented using an "atomic clock" and/or GPS signal receiver.

The key storage device 100 may further comprise one or more input/output devices, such as a keyboard 152, a mouse (not shown), a screen 123, any other suitable I/O devices, or any combination thereof, which may provide data to and/or receive data from a user. For example, and as described in greater detail below, a keyboard 152 may be used to input certain fields of a subordinate certificate which is to be signed using a private root key 101 stored within memory 110. Entering data and requesting the issuance of subordinate certificates may be restricted to authorized system operators, and access to the key storage device 120 may be controlled both physically (e.g., located in an access restricted room) and/or operationally (e.g., requiring that login and password information be entered).

In certain embodiments, the key storage device 100 may further comprise one or more cryptographic engines 121. These cryptographic engines 121 may be configured to implement one or more cryptographic algorithms, such as AES or RSA, and may be implemented in hardware, software, or any appropriate combination thereof. The cryptographic engine 121 may receive data from one or more input/output devices, such as a keyboard 152, for encryption or decryption using a private root key 101. In certain embodiments, the processor 119 may be configured to perform these cryptographic activities instead of or in addition to the cryptographic engine 121.

In one embodiment, the key storage device 100 may further comprise a one-way transmitter 115, configured such that the key storage device 100 may transmit information via a one-way communications link 116, but cannot receive any information over the communications link 116. This transmitter 115 may take any form of hardware (and potentially accompanying software), appropriate for establishing and maintaining one or more one-way communications links 116, provided that the one-way transmitter 115 is not capable of receiving data. For example, this one-way transmitter 115 may comprise an LED connected to an optical fiber cable 116, but lack a photodiode for receiving data over the fiber cable 116. In another embodiment, the one-way transmitter 115 may be a transmitting antenna for wireless data transmission. One having ordinary skill in the art will understand, however, that these references are merely exemplary, and the invention is not limited to any specific form of one-way communications technology.

In one embodiment, the key storage device 100 lacks any hardware and/or software that permits or accepts input from an external source other than hardware and/or software that requires the presence of a human in proximity to the device 100 to accomplish the input (e.g., a keyboard 152 and/or a mouse (not shown)).

As shown on FIG. 1, a one-way communications link 116 may connect the key storage device 100 to an intermediate computing device 120. As will be described in greater detail below, the intermediate computing device 120 may be used to transmit information received from the key storage device 100, such as signed subordinate certificates, to one or more other client computing devices 130 (e.g., servers or end-user computers in need of validating leaf certificates through the use of a subordinate certificate) for use in the PKI. Use of a one-way connection may enhance the security of the system, such that other electronic devices cannot remotely modify or access the key storage device 100, including its key storage 110, by using the connection between the key storage device 100 and the intermediate computing device 120.

Additionally, it may be desirable to ensure that the key storage device 100 is structurally secure. For example, the key storage device 100 may be constructed so that it is tamper-resistant or, at the very least, tamper-evident. In certain embodiments this might mean, for example, that the key storage 101 will be automatically destroyed upon unauthorized access or other tampering with the key storage device 100.

As noted above, the exemplary system shown on FIG. 1 also may comprise an intermediate computing device 120. The intermediate computing device 120 may be any form of computing device, such as a personal computer, server, laptop, desktop, tablet computer, or other specialized device, which is configured to: (i) receive information from the key storage device 100 from the one-way transmitter 115 via the one-way communications link 116, and (ii) transmit information received from the key storage device 100 to one or more other computing devices 130 for use in the PKI.

As shown in FIG. 1, an exemplary intermediate computing device 120 may first comprise a receiver 117, configured to receive data from the key storage device's one-way transmitter 115 via the one-way communications link 116. For example, if the one-way transmitter 115 is an LED connected to an optical fiber cable 116, the intermediate computing device's receiver 117 may comprise a photodiode and associated hardware and software to receive and decode the information.

The intermediate computing device 120 may further comprise one or more communications ports 118 suitable for sending and/or receiving information to one or more other computing devices 130. The one or more communication ports 118 may be comprised of any combination of hardware and/or software appropriate for establishing and maintaining two-way communications, including, but not limited to, wired protocols such as serial, parallel, coaxial, USB, Ethernet, LAN, WAN, the Internet, and wireless protocols such as Bluetooth, near field communications, infrared, IEEE 802.11 and cellular connectors such as 3G, 4G and 4G LTE. It is to be understood, however, that these references are merely exemplary, and the invention is not limited to any specific form of communications technology. This communications port 118 may be used, for example, to send newly created subordinate certificates to their intended holders for use in the PKI or to distribute CRLs within the PKI.

Finally, although not shown on FIG. 1, one having ordinary skill in the art will understand that the intermediate device 120 may include one or more additional component parts, such as additional processors, memory, other data storage units, data transmission lines, communication ports and/or other specialized circuitry.

It also may be desirable to place both the key storage device 100 and the intermediate computing device 120 within a secured facility, such that only certain, preauthorized individuals have access to the room or area in which the key storage device 100 and the intermediate computing device 120 are located. This may further enhance the security of the system and the private root keys 101 stored within the device 100.

However, it will be understood that, while measures may be taken to ensure the security of the intermediate computing device 120, its security may be less critical than the security of the key storage device 100, such that even if the intermediate computing device 120 is compromised, the most a malicious entity may achieve by attacking the intermediate computing device 120 is a denial of service.

In certain embodiments, the key storage device 100 may be configured such that an operator must directly interact with the key storage device 100 (i.e., through operator input provided via, e.g., the keyboard 152) in order to use a stored private root key 101. In other words, if a operator wishes to create a new subordinate certificate or to sign a CRL, the operator must manually enter the command (and any supporting data) using an I/O device that requires the operator to be within physical proximity of the key storage device 100.

Figure 2:
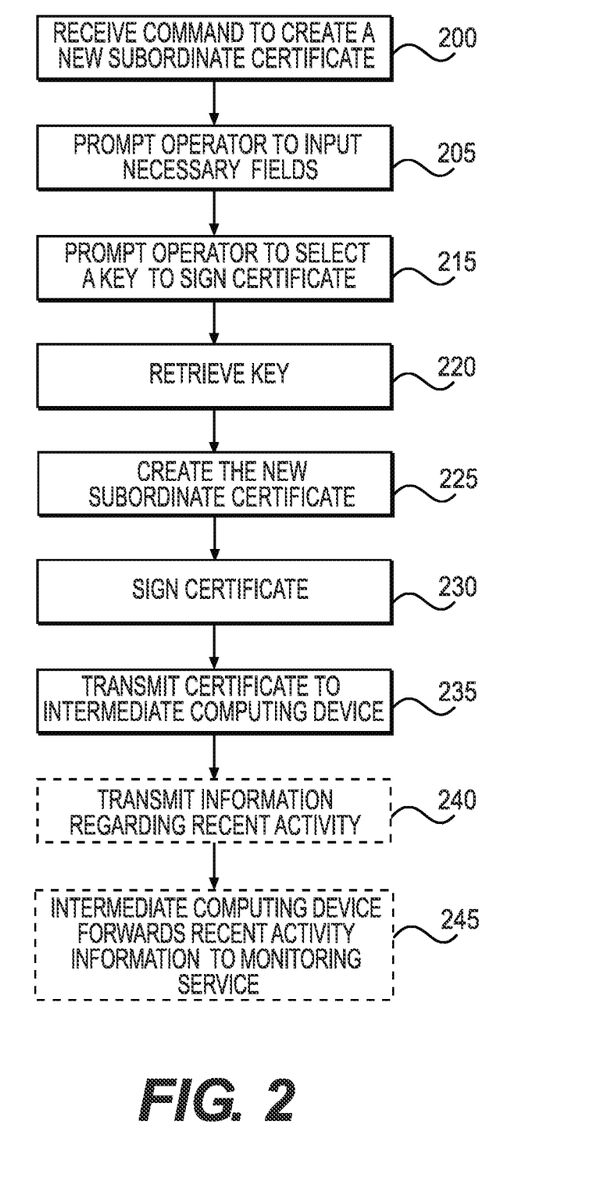
FIG. 2 shows an exemplary method by which a key storage device may be used to create a new subordinate certificate.

FIG. 2 shows one exemplary method by which a key storage device 100 may be used to create a new subordinate certificate.

At step 200, the key storage device 100 may receive a command from an operator to create a new subordinate certificate. In embodiments having a keyboard 152, the operator may manually enter the command using this keyboard 152.

At step 205, the key storage device 100 may prompt an operator to input one or more fields necessary for the subordinate certificate. For example, if the subordinate certificate is an X.509 certificate, the operator may be prompted to enter at least the following: (i) the name of the entity (or person) for which the certificate is being issued; (ii) the public key of the entity (or person) for which the certificate is being issued, as well as the name of the public key algorithm with which the key is intended to be used; and/or (iii) the validity period of the certificate, i.e., the dates and times within which the subordinate certificate is to be valid. The certificate may also require a serial number, which may be entered by an operator, be generated automatically by the key storage device 100, or both methods may be possible in a single device 100.

At step 215, the key storage device 100 may prompt the operator to select a stored root private key 101 to use to sign the newly created subordinate certificate. If the key storage device 100 is configured such that it stores only one private key 101, this step may not be necessary. In embodiments in which the device 100 stores multiple private root keys 101, the operator may select the desired key 101 by, for example, providing or selecting an identifier of the entity whose root private key 101 should be used to digitally sign the certificate (e.g., a name or a public key corresponding to the desired root private key 101).

At step 220, the key storage device 100 may receive this private key 101 information from the operator and may retrieve the corresponding private key 101 within key storage 110.

At step 225, the key storage device 100 may create the subordinate certificate, using the information received at steps 205 and 220. It will be understood that creating the subordinate certificate may include the key storage device 100 generating and/or supplying certain additional information, such as a timestamp showing the time when the certificate was created.

At step 230, the key storage device 100 may digitally sign the created subordinate certificate using the key retrieved at step 220, and may include this digital signature as part of the newly created subordinate certificate. For example, if the newly created certificate is an X.509 certificate, the X.509 standard specifies how the signature should be generated and placed within the certificate.

At step 235, the key storage device 100 may use its one-way transmitter 115 to send the newly created subordinate certificate (including its associated digital signature) to the intermediate computing device 120 via the one-way communications link 116.

As an additional security measure, optionally at step 240, the key storage device 100 may send a message containing information regarding its recent activity to the intermediate computing device 120 via the one-way communications link 116. For example, the message may comprise information regarding the type of activity (e.g., issuing a new certificate) and the time of the activity. At optional step 245, the intermediate computing device 120 may forward the message to a monitoring service 160 capable of analyzing and/or monitoring the activities of the key storage device 100. For example, such a monitoring service may issue an alert or an alarm to an appropriate person and/or device (not shown), if it receives a message indicating a problem or inappropriate activity (e.g., that activity has occurred at a time when no activity should ordinarily occur). Alternatively, the intermediate computing device 120 may analyze the information in the message and raise the appropriate alarm or alert.

In certain embodiments, it may be desirable to automate one or more private key 101 operations which do not require substantial operator input. For example, in a wide range of PKI systems, it is desirable to provide a mechanism by which the recipient of a digitally-signed message can obtain confirmation from the appropriate CA that the message sender's digital certificate (which can be used to authenticate the message) is still valid. This confirmation usually comes in the form of a CRL (or an OCSP response). Each CRL generally includes a timestamp, and is digitally signed by the appropriate CA. For this scheme to provide sufficient security (in particular, to prevent replay attacks), new CRLs are generally re-issued at regular intervals, e.g., once per day or once per hour. Unless a certificate revocation occurs between the reissuance of a CRL, the newly reissued CRL is generally exactly the same as the previous CRL (except for the timestamp and signature) and may be reissued automatically as described below without requiring operator input.

Figure 3:
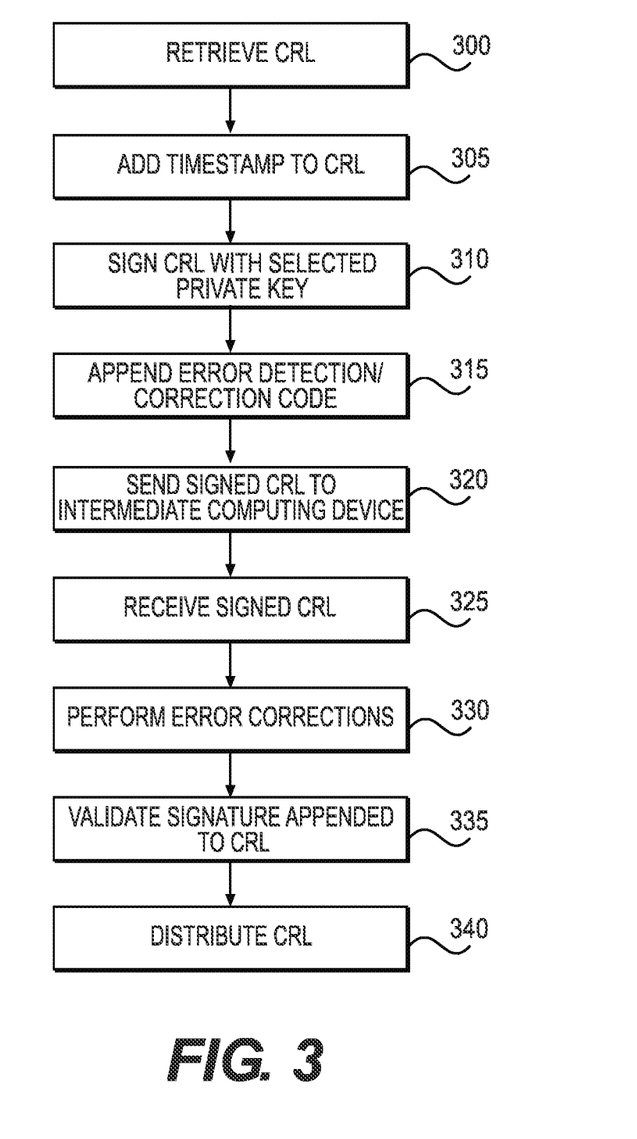
FIG. 3 shows an exemplary method by which a CRL may be distributed.

FIG. 3 shows an exemplary method by which a key storage device 100 may reissue and distribute one or more CRLs stored within CRL storage 102. The command to redistribute a CRL may be automatically generated by the key storage device 100 based on the passage of a predetermined amount of time. For example, in certain embodiments, the key storage device 100 may be configured to automatically reissue and re-sign a CRL once per day, once per hour, or once per some other time interval. In other embodiments, the command to redistribute a CRL may be manually initiated by an operator.

In still other embodiments, the command to redistribute a CRL may be automatically generated when an operator updates a CRL in CRL storage 102. To enhance security, embodiments according to the present disclosure may be configured to require the operator to manually update the CRL, i.e., the CRL may not be updated without the operator inputting data to the key storage device 100 via, e.g., the keyboard 152. In such embodiments, it will be understood that the operator may need to specifically identify a particular CRL within CRL storage 102 to update and redistribute, and the particular private root key 101 which should be used to digitally sign the updated CRL.

At step 300, the key storage device 100 may retrieve the appropriate CRL from CRL storage 102. Then, at step 305, the key storage device 100 may add a timestamp to the CRL. This timestamp may be generated by, for example, timer 103. At step 310, the key storage device 100 may digitally sign the time-stamped CRL using the appropriate private key 101.

At step 315, the key storage device 100 may append one or more error detection and/or error correction codes to the message with the signed CRL. As the connection 116 is a one-way connection—and, therefore, traditional correction methods, involving feedback from the intermediate computing device 120 that will receive the CRL (for example, TCP retransmission) is not possible—error detection and/or correction codes may be used to facilitate reliable delivery of the CRL.

In one embodiment, a message checksum (for instance, a Cyclic Redundancy Check such as CRC-32) may be added to the message to make it possible to detect errors in transmission. In another embodiment, the message may be sent without the additional checksum, and the intermediate device 120 may rely on the signature verification of the CRL (performed at step 335, as described below) instead.

Instead of, or in addition to, error detection mechanisms, some embodiments may provide for the use of one or more error correction codes (such as, for instance, Hamming codes or Reed-Solomon codes), which may be used to correct occasional errors which might occur during the process of data transmission.

At step 320, the message (i.e., the CRL, including its digital signature, together with error detection and correction codes, if any) may be sent to the intermediate computing device 120 via the one-way transmitter 115 over the one-way connection 116, and at step 325, the intermediate computing device 120 may receive the signed message via the receiver 117.

At step 330, various error detections and corrections may be performed, depending on the actual presence of errors and nature of the error detection/correction codes sent by the key storage device 100, and at step 335, the received CRL may be validated using the public key corresponding to the root private key 101 used to sign the CRL. At step 340, provided that the corrections and validations performed at steps 330 and 335 pass successfully, the CRL may be redistributed to one or more clients 130 for further use. In another embodiment, the CRL may be published on the Internet. In some embodiments, the intermediate computing device 120 may cache the received CRL and provide it in reply to one or more client 130 requests.

In some embodiments, it may be desirable to repeat steps 320-340 multiple times for each signed CRL. For example, a CRL may only need to be re-signed once per day, but that same signed CRL may be retransmitted over the one-way connection 116 once per minute over the course of the day. In this manner, if any given transmission via the one-way connection 116 is interrupted or otherwise adversely affected, it will fail one of the validations in steps 330-335 (and will be subsequently dropped), but the proper message can be acquired during a subsequent transmission shortly thereafter.

As a result of the one-way property of the one-way communications link 116, it will be understood that it is very difficult, if not impossible, to mount a remote attack (except for a DoS attack against the intermediate computing device 120) on a private key 101 stored within the key storage device 100, even if the intermediate computing device 120 is under complete control of the attacker.

The foregoing discussion with respect to FIG. 3 was directed to the reissuance and distribution of CRLs. In some embodiments, instead of (or in addition to) reissuing CRLs, it may be desirable to reissue OCSP responses. In these embodiments, the exemplary method described above with respect to FIG. 3 for CRLs may be used to reissue OCSP responses (without a nonce extension). Accordingly, instead of the key storage device 100 re-signing and resending CRLs at regular intervals, the key storage device 100 may re-sign and resend OCSP responses over the one-way link 116 (together with, or instead of CRLs) at regular intervals in the same manner as is described for CRLs. For example, the key storage device 100 may re-sign and resend one OCSP response for each valid certificate issued by a private root key 101 stored within the key storage device 100.

It will be understood that, although the method shown with respect to FIG. 3 has focused on CRLs and OCSP responses, these message formats are merely exemplary, and that other similar messages may also be re-signed in a similar manner at the same or at similar time intervals as described with respect to FIG. 3.

It should be further noted that in some embodiments, a root private key holder (such as a CA) may elect not to sign CRLs and/or OCSP responses itself, but to delegate the signing of CRLs and/or OCSP responses to a "delegate signer" possessing a subordinate key (with an appropriate certificate, e.g., a certificate signed by the root private key holder).

In embodiments with a delegate signer, a key storage device configured as described with respect to FIG. 1 may: (i) store the root private key; (ii) issue one or more certificates (including certificates for delegate signers); (iii) update, issue and reissue one or more CRLs (which CRLs may be updated to include a certificate of a delegate signer, if any such certificate is compromised); and/or (iv) issue and re-issue one or more OCSP responses (including OCSP responses for a delegate signer).

In some embodiments having a delegate signer, a first key storage device 100 may store the root private key and issue one or more certificates (including certificates for delegate signers), while a second key storage device 100, again configured as described with respect to FIG. 1, may store the delegate signer key as a root private key and be responsible for issuing/reissuing CRLs and/or OCSP responses.

Figure 4A:
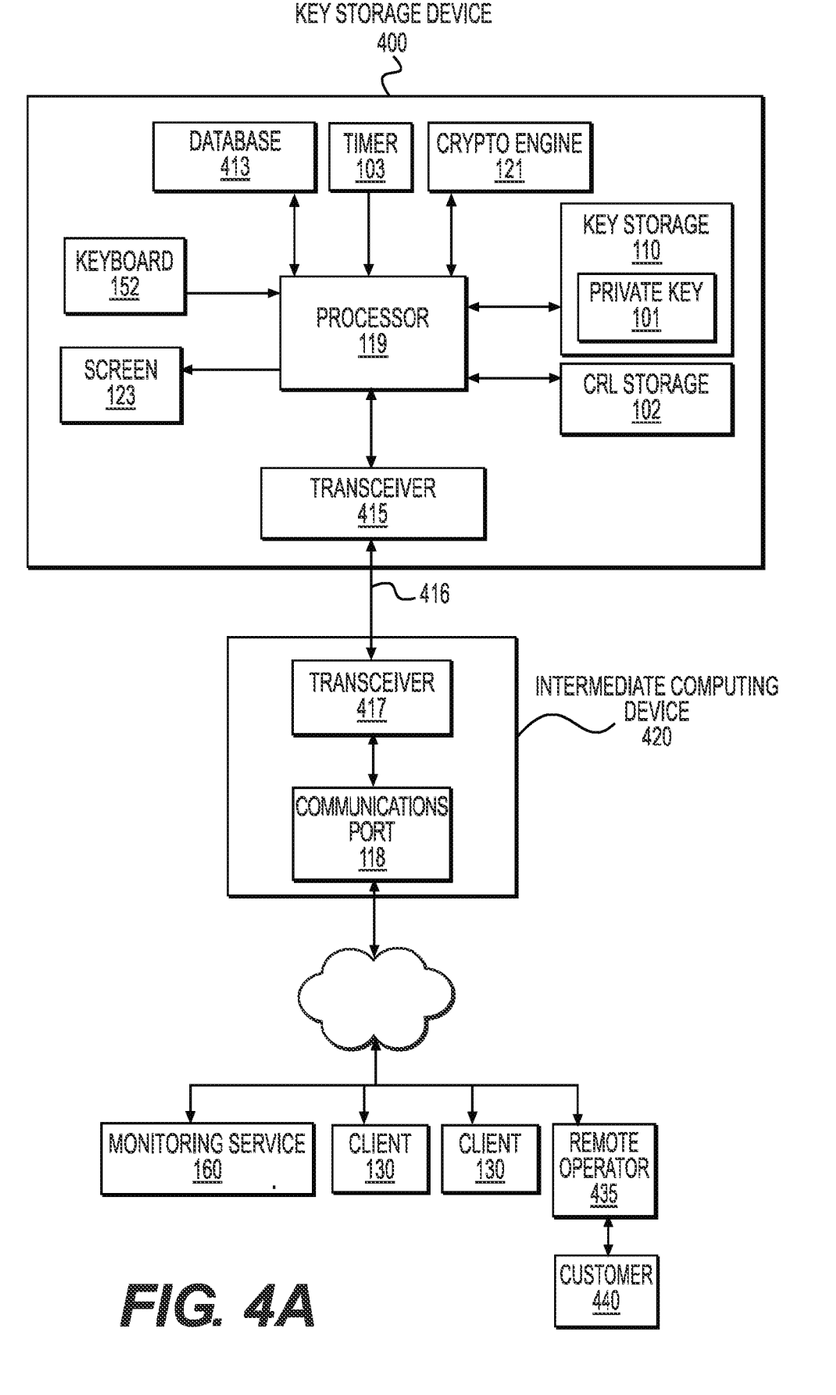
FIG. 4A is a block diagram of an alternate device and/or system according to the present disclosure.

FIG. 4A depicts an alternate embodiment according to the present disclosure. In some situations the CA may be required to issue new certificates frequently enough that requiring an operator to manually input new certificate information could be impractical. The exemplary system depicted in FIG. 4A is configured to allow very limited two-way communications with a key storage device 400, as described in greater detail herein. This may allow the transmission of data into the key storage device 400 (such as new certificate information) from an intermediate computing device 420 but, because of the significant limitations on communications coming into the key storage device 400, the overall security of the system may be preserved.

It will be understood that, except as otherwise specifically noted herein, the components of each of the key storage device 400, intermediate computing device 420 and any client devices 130 may be structurally and functionally similar to the similarly-numbered counterparts already described with respect to FIG. 1.

As shown in FIG. 4A, a key storage device 400 may comprise: a key storage 110 configured to store one or more cryptographic keys 101; one or more CRL storages 102 used to store one or more CRLs; at least one processor 119 configured to retrieve and manipulate one or more stored private root keys 101; a timer 103; one or more input/output devices, such as a keyboard 152, a mouse (not shown), a screen 123, or any combination thereof; and/or one or more cryptographic engines 121.

Unlike the embodiment depicted in FIG. 1, a key storage device 400 as shown in FIG. 4A may comprise a two-way transceiver 415, rather than a one-way transmitter 115. Similarly, the intermediate computing device 420 may comprise a two-way transceiver 417, rather than a one-way receiver 117, such that the key storage device 400 and the intermediate computing device 420 may be connected by a two-way connection 416.

In such an embodiment, however, the two-way connection 416 may be a non-routable, point-to-point connection, such as an RS-232 or 10BASE-T connection, rather than a regular network connection such as traditional TCP/IP network. If the two-way connection 416 is a 10BASE-T (or similar) connection, it will be understood that in some embodiments it may be preferable to ensure that this is a strictly OSI Level 1 connection, i.e., without the corresponding OSI Level 2 layer. While using a Level 2 connection is possible, it will be understood that using it may, in certain embodiments, adversely affect security due to an increased attack surface. One having ordinary skill in the art will understand, however, that these references are merely exemplary, and the invention is not limited to any specific form of communications technology. In this embodiment, the system may support certificate operations that are, due to external constraints, dependent on network access for the provision of any necessary data.

In certain embodiments, the system may only allow a very limited set of operations to be accepted by the key storage device 400 over the two-way connection 416, requiring other operations to be done manually or to be issued automatically. For example, in one exemplary embodiment, the key storage device 400 may be configured to receive an instruction to create a new certificate via the two-way connection 416, but may further be configured to require an instruction to update a CRL to be entered manually on keyboard 152, and to require an instruction to reissue a CRL to be issued automatically (e.g., based on timer 103) within the key storage device 100.

Figure 4B:
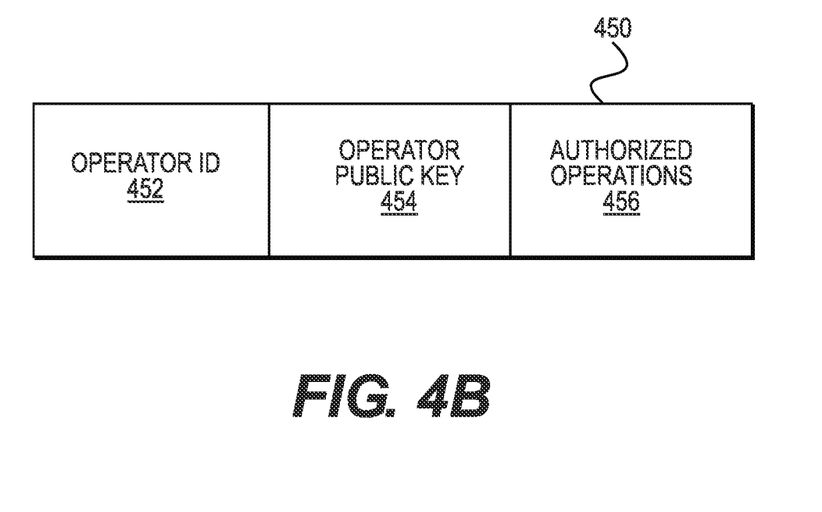
FIG. 4B depicts an exemplary structure of an operator record which may be used in support of the system shown on FIG. 4A.

Further, a key storage device 400 may comprise a database 413 listing remote operators 435 that are authorized to issue requests over the two-way connection 416 that the key storage device 400 perform certain operations. FIG. 4B shows an exemplary remote operator record 450 within this database 413, showing one or more attributes of an authorized remote operator. As shown on FIG. 4B, each record 450 may comprise, for example, an operator ID 452, an operator public key 454 (which can be used for operator signature verification), and a list of operations 456 that a particular operator is allowed to perform (e.g., to sign new certificates). For security reasons, in certain embodiments, such a list may be entered and maintained manually.

One or more remote operators 435 may connect to a key storage device 400 (through an intermediate computing device 420) using a remote computing device. The remote operator 435 may use such a remote computing device to provide commands to and otherwise operate the key storage device 400. A remote operator 435 may, for example, receive and process one or more Certificate Signing Requests (CSRs) from a customer 440, as will be described in greater details with respect to FIGS. 5 and 6.

It is to be recognized that remote operator 435 as used herein may, depending on the context as understood by a person of skill in the art, refer to a person operating the remote computing device, to the remote computing device itself, or both.

Figure 5:
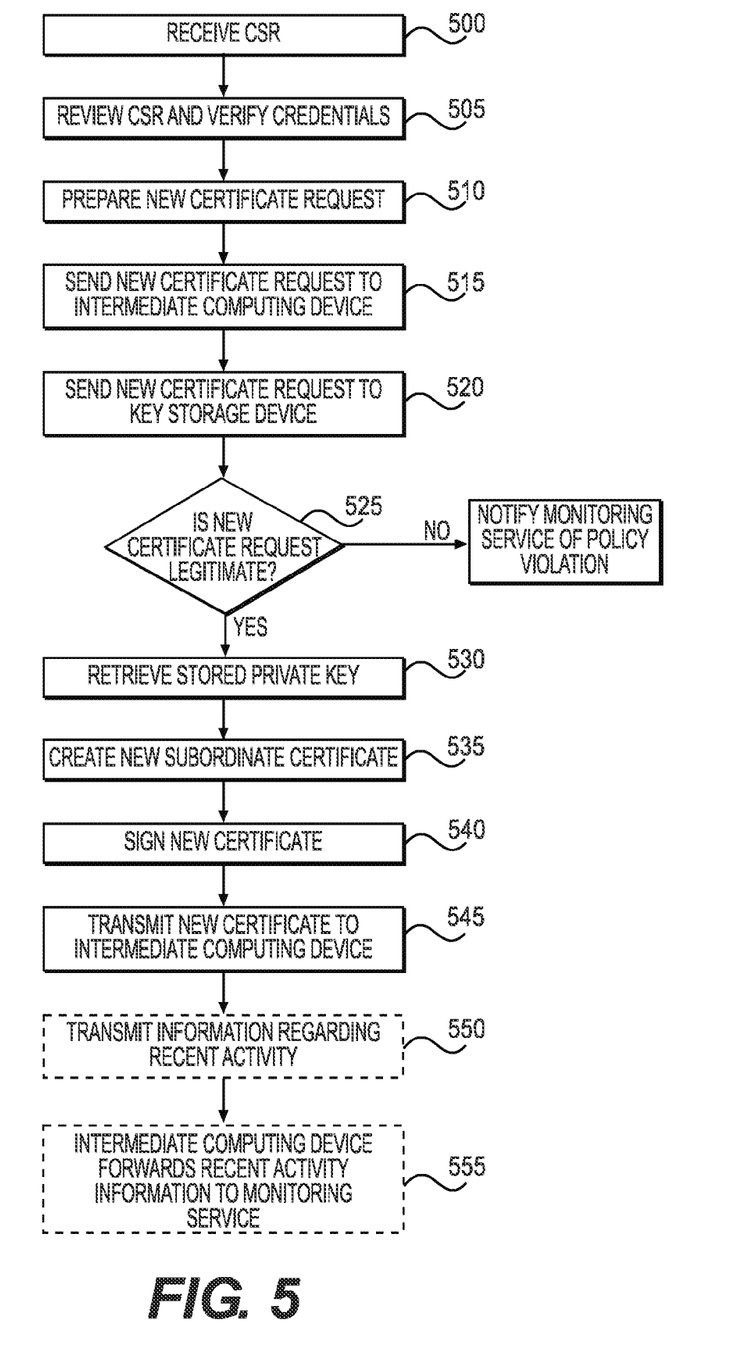
FIG. 5 shows an exemplary method by which a subordinate certificate may be issued using the system depicted in FIG. 4A.
Figure 6:
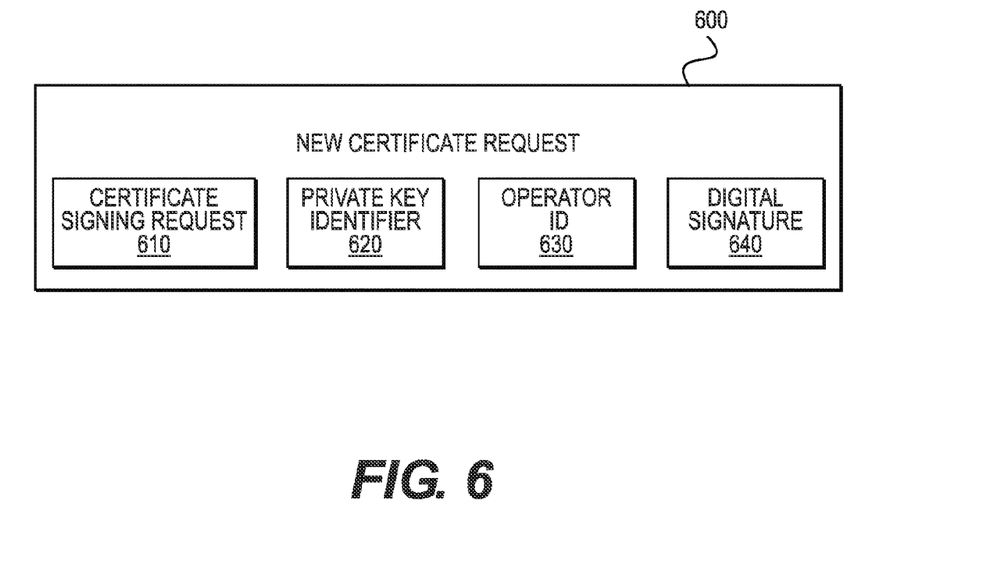
FIG. 6 depicts an exemplary structure of a "new certificate request" which may be used in support of the method described with respect to FIG. 5.

FIG. 5 illustrates an exemplary method by which a subordinate certificate may be issued using the system depicted on FIG. 4. FIG. 6 depicts an exemplary structure of a "new certificate request" 600 which may be used in support of the method described with respect to FIG. 5.

At step 500, a remote operator 435 may receive a new Certificate Signing Request (CSR) from a certificate applicant (e.g., customer 440). A CSR may contain information identifying the applicant (such as a distinguished name and/or other fields in the case of an X.509 certificate), and the public key chosen by the applicant (for example, an applicant may generate a public/private keypair and send the public key as a part of the CSR). The CSR may further be accompanied by other credentials or proof of identity.

At step 505, the remote operator 435 may review the CSR, verify the applicant's credentials, and determine whether the applicant's certificate should be signed.

At step 510, the remote operator 435 may prepare a new certificate request 600. Such a request 600 may comprise: (i) the Certificate Signing Request 610 (as received from the applicant); (ii) a root private key identifier 620 indicating which stored root private key 101 should be used to sign the newly created subordinate certificate; (iii) the operator ID 630 identifying the remote operator 435, and (iv) the operator's digital signature 640, which may be used to show that the request 600 was prepared by the remote operator 435 identified by operator ID 630. The request 600 may optionally comprise other relevant information (not shown).

At step 515, the remote operator 435 may send the new certificate request 600 to the intermediate computing device 420. Depending on the nature of the communications link between the remote communications device 435 and the intermediate computing device 420, the intermediate computing device 420 may perform one or more verifications that the request was received properly. At step 520, the new certificate request 600 may be transmitted from the intermediate computing device 420 (using its two-way transceiver 417) to the key storage device 400.

Upon receipt of the new certificate request 600, the key storage device 400 may perform one or more verifications with respect to the new certificate request 600 to confirm its authenticity. For example, at step 525, the key storage device 400 may verify: (i) that the database 413 of operators contains a record 450 for a remote operator 435 having operator ID 630; (ii) that the identified remote operator 435 has the appropriate authority to sign new certificates (as found in field 456); and/or (iii) that the remote operator's digital signature 640 can be verified by the remote operator's key 454. If one or more of these verifications fails, the request to create a new certificate may be denied. In some embodiments, a message reflecting the fact that a request was made and denied may be sent to the intermediate computing device 420 so that the intermediate computing device 420 may forward this message to a monitoring service 160 capable of logging, analyzing and/or monitoring the activities of the key storage device 400.

Otherwise, if all verifications pass successfully, then, at step 530, the key storage device 400 may retrieve the root private key 101 identified by identifier 620 from the key storage 110.

At step 535, the key storage device 400 may create the new subordinate certificate, using the information found in the Certificate Signing Request 610, and, at step 540, the key storage device 400 may digitally sign the created subordinate certificate using the key retrieved at step 530, and may add this digital signature to the newly created subordinate certificate.

At step 545, the key storage device 400 may use its two-way transceiver 415 to send the newly created subordinate certificate (and its associated digital signature) to the intermediate computing device 420 via the two-way communications link 416.

As an additional security measure, optionally at step 550, the key storage device 400 may send a message with information regarding its recent activity to the intermediate computing device 420 via the two-way communications link 416. For example, the message may comprise information regarding the type of activity (e.g., processing a new certificate request), the operator ID of the remote operator, and/or the time the new certificate request was received by the key storage device 400. At optional step 555, the intermediate computing device 420 may forward this message to a monitoring service 160 capable of logging, analyzing and/or monitoring the activities of the key storage device 100. For example, such a monitoring service may issue an alter or an alarm to an appropriate person or device (not shown), if it receives a message indicating a problem or inappropriate activity (e.g., that activity has occurred at a time when no activity should ordinarily occur). Alternatively, the intermediate computing device 420 may log, analyze and/or monitor the information in the message and issue the appropriate alarm or alert.

It some embodiments, to enhance security, a new certificate request may be signed by more than one remote operator. In such an embodiment, the new certificate request 600 may include more than one remote operator ID 630, and a corresponding number of remote operator signatures 640. For example, two remote operators may independently verify the credentials of a certificate applicant and sign the request. In such embodiments, at step 525, the key storage device 400 may verify the digital signatures 640 of all the remote operator IDs 630 listed in the certificate request 600.

Figure 7:
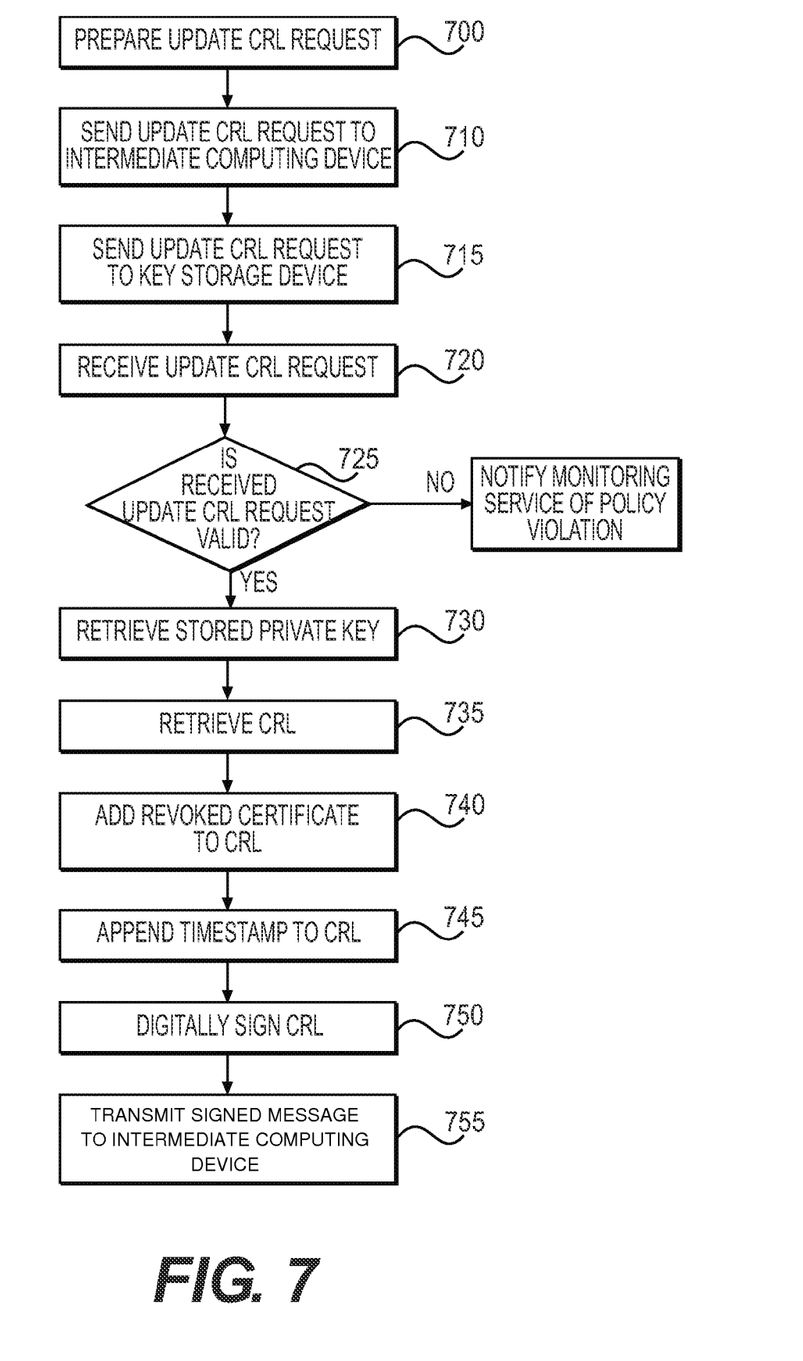
FIG. 7 shows an exemplary method by which an issued digital certificate can be added to a CRL such that the issued certificate is considered revoked going forward.
Figure 8:
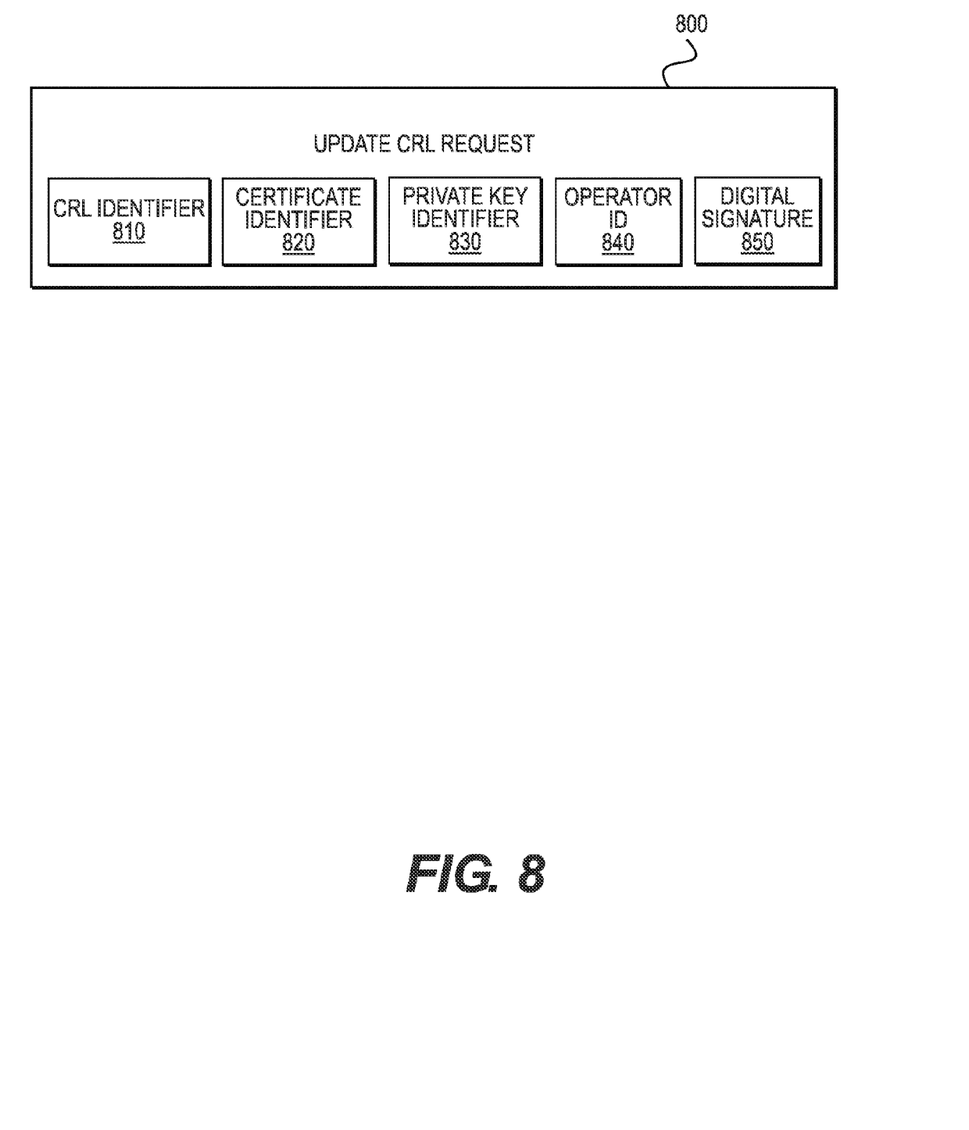
FIG. 8 depicts an exemplary structure of an "update CRL request" which may be used in support of the method described with respect to FIG. 7.

In another embodiment, the system shown with respect to FIG. 4 may support one or more additional operations. FIG. 7 shows an exemplary method by which a previously issued digital certificate can be added to a CRL, such that the issued certificate is considered revoked going forward. FIG. 8 depicts an exemplary structure of an "update CRL request" 800 which may be used in support of the method described with respect to FIG. 7.

At step 700, a remote operator 435 may prepare an "update CRL request" 800 for transmission to the key storage device 400.

The update CRL request 800 first may comprise a CRL identifier 810, which may be, for example, the name of the CRL, or a public key corresponding to the root private key 101 which has been used in the past to sign the CRL. It may further comprise a certificate identifier 820, such as a serial number of the certificate that should be revoked. The update CRL request 800 may further comprise a root private key identifier 830, indicating which stored root private key 101 should be used to re-sign the updated CRL.

Additionally, this update CRL request 800 may comprise (i) an operator ID 840, which can be used to identify the remote operator, and (ii) the remote operator's digital signature 850, which may be used to show that the request 800 was prepared by the remote operator identified by operator ID 840. The request 800 may optionally comprise other relevant information.

At step 710, the remote operator 435 may send the update CRL request 800 to the intermediate computing device 420. Depending on the nature of the communications link between the remote operator 435 and the intermediate computing device 420, the intermediate computing device 420 may perform one or more verifications that the request was received properly.

At step 715, the update CRL request 800 may be transmitted from the intermediate computing device 420 (using its two-way transceiver 417) to the key storage device 400, and at step 720, the update CRL request may be received by the key storage device 400 (using its two-way transceiver 415).

Upon receipt of the update CRL request 800, the key storage device 400 may perform one or more verifications with respect to the update CRL request 800 to confirm its authenticity. For example, at step 725, the key storage device 400 may verify: (i) that the database 413 of remote operators contains a record 450 for a remote operator having operator ID 840; (ii) that the identified remote operator 435 has the appropriate authority to update CRLs (as found in field 456); and (iii) that the remote operator's digital signature 850 can be verified by the remote operator's key 454. If one or more of these verifications fails, the request to update the CRL may be denied. In some embodiments, a message reflecting the fact that a request was made and denied may be sent to the intermediate computing device 420 so that the intermediate computing device 420 may forward this message to a monitoring service 160 capable of logging, analyzing and/or monitoring the activity of the key storage device 400.

If the remote operator credentials are successfully validated at this step 725, at step 730, the key storage device 400 may retrieve the root private key 101 identified by identifier 830 from the key storage 110, and at step 735, the key storage device 100 may retrieve the appropriate CRL from CRL storage 102.

At step 740, the key storage device 100 may add the certificate identifier 820 to the CRL, and at step 745 may append a timestamp to the CRL using, e.g., timer 103. At step 750, the key storage device 100 may digitally sign the time-stamped CRL using the appropriate private key 101. At step 755, the signed message (i.e., CRL and digital signature) may be sent to the intermediate computing device 420 via the two-way transceiver 415 over the two-way connection 416. The updated CRL now may be distributed to clients 130 as appropriate. Additionally, this updated CRL may be automatically reissued, for example, as described with respect to FIG. 3. Further, the key storage device 400 may report information about its recent activity by performing steps similar to steps 550 and 555 as discussed with respect to FIG. 5.

It should be noted that in some embodiments, to enhance security, an update CRL request may be signed by more than one remote operator. In such embodiments, the update CRL request 800 may include more than one remote operator ID 840, and a corresponding number of digital signatures 850. In such embodiments, at step 725, the key storage device 100 may verify the digital signatures 850 of all the remote operator IDs 840 listed in the update CRL request 800.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each imaged apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. An apparatus, comprising:
a first non-volatile storage for storing a plurality of private root key of a certificate authority for signing digital certificates;
an input device for receiving manual input from an operator;
a communication interface consisting of a one-way transmitter for transmitting information from the apparatus; and
a processor configured to:
  select a private root key from the plurality of private root keys according to the manual input received through the input device;
  retrieve the selected private root key from the first non-volatile storage;
  receive information for a new digital certificate through the input device;
  generate the new digital certificate according to the received information;
  sign the new digital certificate using the private root key; and
  transmit the new digital certificate from the apparatus using the transmitter.

2. The apparatus of claim 1, further comprising:
a timer, and
a second non-volatile storage for storing a certificate revocation list (CRL); and
wherein the processor is further configured to:
  retrieve the CRL;
  add a timestamp generated by the timer to the retrieved CRL;
  sign the retrieved CRL using the private root key; and
  transmit the signed CRL through the transmitter from the apparatus.

3. The apparatus of claim 2, wherein the processor is further configured to append one or more error detection codes, error correction codes, or both to the signed CRL.

4. The apparatus of claim 2, wherein the processor is further configured to add a timestamp to the retrieved CRL, sign the retrieved CRL and transmit the signed CRL at regular intervals.

5. The apparatus of claim 2, wherein the processor is further configured to transmit the signed CRL at regular intervals.

6. The apparatus of claim 1, wherein the processor is further configured to transmit the new digital certificate at regular intervals.

7. The apparatus of claim 1, wherein the processor is further configured to transmit, via the transmitter, a message containing information regarding the apparatus's recent activity to a monitoring service for analyzing and monitoring activities of the apparatus.

8. A system, comprising:
a first device, comprising:
a first non-volatile storage for storing a plurality of private root key of a certificate authority for signing digital certificates;
an input device for receiving manual input from an operator;
a communication interface consisting of a one-way transmitter for transmitting information from the first device to a second device; and
a processor configured to select a private root key from the plurality of private root keys according to the manual input received through the input device and generate new digital certificates to be transmitted to the second device; and
the second device, comprising:
a receiver coupled to the transmitter of the first device; and
a communication port for establishing a two-way communication channel with an external network.

9. The system of claim 8, wherein, to generate new digital certificates to be transmitted to the second device, the processor of the first device is configured to:
retrieve the private root key from the first non-volatile storage;
receive information for a new digital certificate through the input device;
generate the new digital certificate according to the received information;
sign the new digital certificate; and
transmit the new digital certificate from the first device to the second device using the transmitter.

10. The system of claim 8, wherein the first device further comprises:
a timer, and
a second non-volatile storage for storing a certificate revocation list (CRL); and
wherein the processor is further configured to:
retrieve the CRL;
add a timestamp generated by the timer to the retrieved CRL;
sign the retrieved CRL using the private root key; and
transmit the signed CRL through the transmitter from the apparatus.

11. The system of claim 10, wherein the processor is further configured to append one or more error detection codes, error correction codes, or both to the signed CRL.

12. The system of claim 11, wherein the second device is configured to perform error detections and corrections appended to the signed CRL and distribute the signed CRL to client devices.

13. The system of claim 10, wherein the processor is further configured to add a timestamp to the retrieved CRL, sign the retrieved CRL and transmit the signed CRL at regular intervals.

14. The system of claim 8, wherein the processor is further configured to transmit, via the transmitter and the second device, a message containing information regarding the first device's recent activity to a monitoring service for analyzing and monitoring activities of the first device.

15. A system, comprising:
a first device, comprising:
a first non-volatile storage for storing a plurality of private root key of a certificate authority for signing digital certificates;
an input device for receiving manual input from an operator;
a first transceiver for communication with a second device; and
a processor configured to:
receive a new digital certificate request;
verify that the new digital certificate request is valid;
select a private root key from the plurality of private root keys according to the manual input received through the operator;
retrieve the selected private root key from the first non-volatile storage;
generate the new digital certificate according to the new digital certificate request;
sign the new digital certificate using the private root key; and
transmit the new digital certificate from the first device to the second device using a transmitter; and
the second device, comprising:
a second transceiver coupled to the first transceiver of the first device, wherein the first and second transceivers are coupled together by a non-routable, point-to-point connection; and
a communication port for establishing a two-way communication channel with an external network.

16. The system of claim 15, wherein the first device further comprises:
a timer, and
a second non-volatile storage for storing a certificate revocation list (CRL); and
wherein the processor is further configured to:
receive an update CRL request;
verify that the update CRL request is valid;
retrieve the CRL;
add a timestamp generated by the timer to the retrieved CRL;
sign the retrieved CRL using the private root key; and
transmit the signed CRL through the transmitter from the apparatus.

17. The system of claim 15, wherein the update CRL request is signed by more than one remote operator and the processor is further configured to verify that each remote operator signing the update CRL request has a valid operator's digital signature.

18. The system of claim 15, wherein the new digital certificate request is signed by more than one remote operator and the processor is further configured to verify that each remote operator signing the new digital certificate request has a valid operator's digital signature.

19. The system of claim 15, wherein verifying that the new digital certificate request is valid comprises verifying that a remote operator signing the new digital certificate request has a valid operator's digital signature.

20. A computer-implemented method, comprising:
storing, in a first non-volatile storage of a first device, a plurality of private root key of a certificate authority for signing digital certificates;
receiving manual input from an operator for information about a new digital certificate;
select a private root key from the plurality of private root keys according to the manual input received from the operator;
retrieving the selected private root key from the first non-volatile storage;

generating the new digital certificate according to the received information;

signing the new digital certificate using the private root key; and transmitting the new digital certificate from the first device to a second device connected to the first device by a one-way connection.

21. The computer-implemented method of claim 20, further comprising:

storing a certificate revocation list (CRL) at the first device;

retrieving the CRL;

adding a timestamp generated by a timer to the retrieved CRL;

signing the retrieved CRL using the private root key; and transmitting the signed CRL to the second device.

22. The computer-implemented method of claim 21, further comprising appending one or more error detection codes, error correction codes, or both to the signed CRL.

23. The computer-implemented method of claim 22, further comprising performing, at the second device, error detections and corrections appended to the signed CRL and distributing the signed CRL to client devices.

24. The computer-implemented method of claim 21, further comprising adding a timestamp to the retrieved CRL, signing the retrieved CRL and transmitting the signed CRL at regular intervals.

25. The computer-implemented method of claim 21, wherein transmitting the signed CRL comprises transmitting the signed CRL at regular intervals.

26. The computer-implemented method of claim 20, wherein transmitting the new digital certificate comprises transmitting the new digital certificate at regular intervals.

27. The computer-implemented method of claim 20, further comprising transmitting a message containing information regarding the first device's recent activity to a monitoring service for analyzing and monitoring activities of the first device.

28. A computer-implemented method, comprising:

storing, in a first non-volatile storage of a first device, a plurality of private root key of a certificate authority for signing digital certificates;

receiving a new digital certificate request;

verifying the new digital certificate request is valid;

select a private root key from the plurality of private root keys according to a manual input received through an operator;

retrieving the selected private root key from the first non-volatile storage;

generating the new digital certificate according to the new digital certificate request;

signing the new digital certificate using the private root key; and transmitting the new digital certificate from the first device to a second device by a non-routable, point-to-point connection.

29. The computer-implemented method of claim 28, further comprising:

receiving an update certificate revocation list (CRL) request;

verifying that the update CRL request is valid;

retrieving the CRL;

adding a timestamp generated by a timer to the retrieved CRL;

signing the retrieved CRL using the private root key; and transmitting the signed CRL from the first device to the second device.

30. The computer-implemented method of claim 29, further comprising verifying that each remote operator signing the update CRL request has a valid operator's digital signature.

31. The computer-implemented method of claim 28, further comprising verifying that each remote operator signing the new digital certificate request has a valid operator's digital signature.

32. The computer-implemented method of claim 28, wherein verifying that the new digital certificate request is valid comprises verifying that a remote operator signing the new digital certificate request has a valid operator's digital signature.

* * * * *